United States Patent
Edwards et al.

(10) Patent No.: US 12,157,567 B2
(45) Date of Patent: Dec. 3, 2024

(54) AIRCRAFT WING WITH MOVABLE WING TIP DEVICE

(71) Applicant: AIRBUS OPERATIONS LIMITED, Bristol (GB)

(72) Inventors: Henry Edwards, Bristol (GB); Helen Driffill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 38 days.

(21) Appl. No.: 18/102,924

(22) Filed: Jan. 30, 2023

(65) Prior Publication Data

US 2023/0242242 A1    Aug. 3, 2023

(30) Foreign Application Priority Data

Jan. 31, 2022   (GB) .................................. 2201251

(51) Int. Cl.
| | |
|---|---|
| *B64C 3/56* | (2006.01) |
| *B64C 13/38* | (2006.01) |
| *B64F 5/60* | (2017.01) |
| *H04B 5/24* | (2024.01) |

(52) U.S. Cl.
CPC ............... *B64C 3/56* (2013.01); *B64C 13/38* (2013.01); *B64F 5/60* (2017.01); *H04B 5/24* (2024.01)

(58) Field of Classification Search
CPC . B64C 3/56; B64C 13/38; B64C 3/546; B64F 5/60; H04B 5/24; H04B 5/72; Y02T 50/10; H02J 50/10
See application file for complete search history.

(56) References Cited

U.S. PATENT DOCUMENTS

| | | | | |
|---|---|---|---|---|
| 994,968 | A * | 6/1911 | Barbaudy ................. | B64C 3/14 244/35 R |
| 1,050,222 | A * | 1/1913 | McIntosh .................. | B64C 3/14 244/35 R |
| 1,466,551 | A * | 8/1923 | Thurston ............... | B64C 23/076 244/90 R |
| 1,692,081 | A * | 11/1928 | De La Cierva ....... | B64C 27/023 416/223 R |

(Continued)

OTHER PUBLICATIONS

Balluff "Inductive Couplers", Contactlessly transmit power and data, accessed Jan. 4, 2022 <https://www.balluff.com/en-us/products/areas/A0009/groups/G0905>, six pages, downloaded from the internet Jan. 30, 2023.

(Continued)

*Primary Examiner* — Medhat Badawi
(74) *Attorney, Agent, or Firm* — Nixon & Vanderhye P.C.

(57) ABSTRACT

An aircraft wing is disclosed including a main wing element and a movable wing tip device attached to a tip end of the main wing element. The movable wing tip device can move relative to the main wing element to vary a span of the aircraft wing. An inductive coupler is arranged to inductively transmit data and/or power between the main wing element and the movable wing tip device. The inductive coupler removes the need for wires and cables to pass across a joint between the main wing element and a movable wing tip device. Additional embodiments include a method of maintenance, and a method of operating the aircraft wing to transmit data and/or power between the main wing element and the movable wing tip device.

14 Claims, 6 Drawing Sheets

(56) References Cited

U.S. PATENT DOCUMENTS

| | | | | |
|---|---|---|---|---|
| 1,710,673 A * | 4/1929 | Bonney | B64C 3/44 | 244/90 R |
| 1,841,921 A * | 1/1932 | Spiegel | B64C 23/069 | 244/199.4 |
| 1,888,418 A * | 11/1932 | Adams | B64C 23/076 | 244/65 |
| 2,123,096 A * | 7/1938 | Charpentier | B64C 3/10 | 416/223 R |
| 2,164,721 A * | 7/1939 | Price | B64C 21/025 | 415/914 |
| 2,576,981 A * | 12/1951 | Vogt | B64C 5/08 | 244/199.4 |
| 2,743,888 A * | 5/1956 | Lippisch | B64C 23/076 | 244/46 |
| 2,775,419 A * | 12/1956 | Hlobil | B64C 39/10 | 244/35 R |
| 2,805,830 A * | 9/1957 | Von Zborowski | B64C 29/0091 | 244/34 A |
| 2,846,165 A * | 8/1958 | Axelson | B64C 5/08 | 244/199.4 |
| 3,027,118 A * | 3/1962 | Willox | B64C 30/00 | 244/15 |
| 3,029,018 A * | 4/1962 | Floyd, Jr. | G06G 7/46 | 702/11 |
| 3,128,371 A * | 4/1964 | Spaulding | G06G 7/44 | 700/266 |
| 3,270,988 A * | 9/1966 | Cone, Jr. | B64C 23/069 | 244/35 R |
| 3,684,217 A * | 8/1972 | Kukon | B64C 39/10 | 244/36 |
| 3,712,564 A * | 1/1973 | Rethorst | B64C 23/06 | 244/199.4 |
| 3,778,926 A * | 12/1973 | Gladych | A63H 27/00 | 244/35 R |
| 3,840,199 A * | 10/1974 | Tibbs | B64C 29/02 | 244/207 |
| 4,017,041 A * | 4/1977 | Nelson | B64C 23/076 | 416/142 |
| 4,046,336 A * | 9/1977 | Tangler | B64C 27/463 | 244/130 |
| 4,093,160 A * | 6/1978 | Reighart | B64C 23/06 | 244/209 |
| 4,108,403 A * | 8/1978 | Finch | B64C 23/065 | 244/199.2 |
| 4,172,574 A * | 10/1979 | Spillman | B64C 23/072 | 114/272 |
| 4,190,219 A * | 2/1980 | Hackett | B64C 23/069 | 244/199.4 |
| 4,205,810 A * | 6/1980 | Ishimitsu | B64C 23/065 | 244/199.4 |
| 4,240,597 A * | 12/1980 | Ellis | B64C 3/14 | 244/35 R |
| 4,245,804 A * | 1/1981 | Ishimitsu | B64C 23/069 | 244/199.4 |
| 4,247,062 A * | 1/1981 | Brueckner | B64C 5/08 | 244/91 |
| 4,247,063 A * | 1/1981 | Jenkins | B64C 5/08 | 244/199.4 |
| D259,554 S * | 6/1981 | Parise | D12/338 | |
| 4,365,773 A * | 12/1982 | Wolkovitch | B64C 39/068 | 244/45 R |
| 4,382,569 A * | 5/1983 | Boppe | B64C 23/065 | 244/199.4 |
| 4,429,844 A * | 2/1984 | Brown | B64C 3/48 | 244/219 |
| 4,444,365 A * | 4/1984 | Heuberger | B64C 1/26 | 403/DIG. 7 |
| 4,449,680 A * | 5/1984 | Gratzer | B64D 29/02 | 244/54 |
| 4,449,681 A * | 5/1984 | Gratzer | B64D 29/02 | 244/54 |
| 4,449,682 A * | 5/1984 | Gratzer | B64D 29/02 | 244/54 |
| 4,449,683 A * | 5/1984 | Gratzer | B64C 7/02 | 244/54 |
| 4,455,004 A * | 6/1984 | Whitaker, Sr. | B64C 9/12 | 244/45 R |
| 4,457,479 A * | 7/1984 | Daude | B64C 5/08 | 244/76 R |
| 4,541,593 A * | 9/1985 | Cabrol | B64C 39/068 | 244/45 R |
| 4,545,552 A * | 10/1985 | Welles | B64C 23/076 | 244/199.4 |
| 4,575,030 A * | 3/1986 | Gratzer | B64C 9/146 | 244/209 |
| 4,595,160 A * | 6/1986 | Santos | B64C 23/069 | 244/199.4 |
| 4,598,885 A * | 7/1986 | Waitzman | B64C 23/076 | 244/45 R |
| 4,605,183 A * | 8/1986 | Gabriel | B64C 5/08 | 244/49 |
| 4,667,906 A * | 5/1987 | Suarez | B64C 3/28 | D12/345 |
| 4,671,473 A * | 6/1987 | Goodson | B64C 23/076 | 244/46 |
| 4,674,709 A * | 6/1987 | Welles | B64C 39/10 | 244/45 R |
| 4,700,911 A * | 10/1987 | Zimmer | B64C 3/10 | 244/45 R |
| 4,706,902 A * | 11/1987 | Destuynder | B64C 13/16 | 701/116 |
| 4,714,215 A * | 12/1987 | Jupp | B64C 23/069 | 244/199.4 |
| 4,722,499 A * | 2/1988 | Klug | B64C 23/076 | 244/45 R |
| 4,776,542 A * | 10/1988 | Van Dam | B64C 23/069 | 244/45 R |
| 4,813,631 A * | 3/1989 | Gratzer | B64C 23/00 | 244/209 |
| 4,949,919 A * | 8/1990 | Wajnikonis | B63B 39/06 | 244/45 R |
| 5,039,032 A * | 8/1991 | Rudolph | B64C 23/069 | 244/45 R |
| 5,082,204 A * | 1/1992 | Croston | B64C 39/066 | 244/89 |
| 5,096,382 A * | 3/1992 | Gratzer | B63H 1/16 | 416/189 |
| 5,102,068 A * | 4/1992 | Gratzer | B64C 5/08 | 244/45 R |
| 5,156,358 A * | 10/1992 | Gerhardt | B64C 23/072 | 244/45 R |
| 5,174,721 A * | 12/1992 | Brocklehurst | B64C 27/463 | 416/223 R |
| 5,190,441 A * | 3/1993 | Murphy | B64C 11/008 | 416/201 A |
| 5,275,358 A * | 1/1994 | Goldhammer | B64C 23/069 | 244/199.4 |
| 5,348,253 A * | 9/1994 | Gratzer | B64C 23/069 | 244/199.4 |
| 5,381,986 A * | 1/1995 | Smith | B64C 23/072 | 244/49 |
| 5,407,153 A * | 4/1995 | Kirk | B64C 23/069 | 244/199.4 |
| 5,634,613 A * | 6/1997 | McCarthy | B64C 23/069 | 244/46 |
| 5,778,191 A * | 7/1998 | Levine | H04N 19/00 | 375/E7.279 |
| 5,823,480 A * | 10/1998 | La Roche | B64C 23/072 | 244/199.4 |
| 5,909,858 A * | 6/1999 | Hawley | B64C 3/00 | 244/45 R |
| 5,961,068 A * | 10/1999 | Wainfan | B64C 9/02 | 244/91 |
| 5,975,464 A * | 11/1999 | Rutan | B64C 39/02 | 244/120 |
| 5,988,563 A * | 11/1999 | Allen | B64C 5/08 | 244/45 R |

(56) References Cited

U.S. PATENT DOCUMENTS

| | | | | |
|---|---|---|---|---|
| 5,992,793 A * | 11/1999 | Perry | B64C 27/463 | 244/17.11 |
| 6,015,115 A * | 1/2000 | Dorsett | B64C 3/46 | 244/219 |
| 6,089,502 A * | 7/2000 | Herrick | B64C 3/10 | 244/45 R |
| 6,161,797 A * | 12/2000 | Kirk | B64D 33/06 | 244/1 N |
| 6,161,801 A * | 12/2000 | Kelm | G05D 1/0066 | 244/76 C |
| 6,227,487 B1 * | 5/2001 | Clark | B64C 9/00 | 244/99.12 |
| 6,231,308 B1 * | 5/2001 | Kondo | B64C 27/463 | 416/235 |
| 6,260,809 B1 * | 7/2001 | Egolf | B64C 27/463 | 244/17.11 |
| 6,345,790 B1 * | 2/2002 | Brix | B64C 23/076 | 244/46 |
| 6,375,126 B1 * | 4/2002 | Sakurai | B64C 3/50 | 244/214 |
| 6,394,397 B1 * | 5/2002 | Ngo | B64C 23/072 | 244/203 |
| 6,467,732 B2 * | 10/2002 | Tsukahara | B64C 27/463 | 244/17.11 |
| 6,474,604 B1 * | 11/2002 | Carlow | B64C 39/062 | 244/45 R |
| 6,547,181 B1 * | 4/2003 | Hoisington | B64C 23/072 | 244/46 |
| 6,578,798 B1 * | 6/2003 | Dizdarevic | B64C 23/069 | 244/35 R |
| 6,622,974 B1 * | 9/2003 | Dockter | B64C 3/48 | 244/218 |
| 6,726,149 B2 * | 4/2004 | Wojciechowski | B64C 3/00 | 244/119 |
| 6,743,504 B1 * | 6/2004 | Allen | B29D 99/0017 | 428/36.1 |
| 6,772,979 B2 * | 8/2004 | Kubica | B64C 13/16 | 701/3 |
| 6,796,534 B2 * | 9/2004 | Beyer | B64C 3/48 | 244/214 |
| 6,827,314 B2 * | 12/2004 | Barriety | B64C 23/072 | 244/204.1 |
| 6,910,661 B2 * | 6/2005 | Dockter | B64C 3/54 | 244/218 |
| 6,926,345 B2 * | 8/2005 | Ortega | B62D 35/008 | 296/180.1 |
| 7,048,228 B2 * | 5/2006 | Vassberg | B64C 3/28 | 244/35 R |
| 7,475,848 B2 * | 1/2009 | Morgenstern | B64C 30/00 | 244/35 R |
| D595,211 S * | 6/2009 | Cazals | D12/345 | |
| 7,597,285 B2 * | 10/2009 | Schweiger | B64C 9/10 | 244/75.1 |
| 7,644,892 B1 * | 1/2010 | Alford, Jr. | B64C 23/065 | 244/35 R |
| 7,789,343 B2 * | 9/2010 | Sarh | B64C 3/54 | 244/46 |
| 7,798,443 B2 * | 9/2010 | Hamilton | B64C 3/38 | 244/99.8 |
| 7,900,877 B1 * | 3/2011 | Guida | B64C 23/076 | 244/199.4 |
| 7,980,515 B2 * | 7/2011 | Hunter | B64C 23/069 | 244/198 |
| 7,988,099 B2 * | 8/2011 | Bray | B64C 13/16 | 244/199.4 |
| 7,997,875 B2 * | 8/2011 | Nanukuttan | F03D 1/0675 | 416/237 |
| 8,083,185 B2 * | 12/2011 | Konings | B64C 23/072 | 244/199.4 |
| 8,123,160 B2 * | 2/2012 | Shepshelovich | B64U 10/80 | 244/45 R |
| 8,241,002 B2 * | 8/2012 | Wobben | F03D 1/0675 | 416/235 |
| 8,256,719 B2 * | 9/2012 | Wood | B64C 3/48 | 244/214 |
| 8,333,348 B1 * | 12/2012 | Miller | B64U 30/12 | 244/199.4 |
| 8,336,830 B2 * | 12/2012 | Eberhardt | B64C 3/54 | 244/218 |
| 8,342,447 B2 * | 1/2013 | Etling | B64C 7/00 | 244/90 R |
| 8,366,057 B2 * | 2/2013 | Vos | B64C 3/50 | 244/214 |
| 8,382,041 B1 * | 2/2013 | Yechout | B64C 23/069 | 244/199.4 |
| 8,444,389 B1 * | 5/2013 | Jones | F01D 5/14 | 416/193 A |
| 8,651,427 B1 * | 2/2014 | Malachowski | B64C 23/069 | 244/199.4 |
| 8,651,431 B1 * | 2/2014 | White | B64C 23/072 | 244/46 |
| D716,978 S * | 11/2014 | Selvaag | D26/28 | |
| 8,894,018 B2 * | 11/2014 | Boer | B64C 23/072 | 244/199.4 |
| 8,925,870 B1 * | 1/2015 | Gordon | B64C 3/28 | 244/214 |
| 9,469,391 B1 * | 10/2016 | Dong | B64C 3/385 | |
| 9,505,484 B1 * | 11/2016 | Al-Sabah | B64C 1/26 | |
| 9,517,834 B2 * | 12/2016 | Thompson | B64D 45/0005 | |
| 9,623,960 B2 * | 4/2017 | Devenyi | B64C 39/10 | |
| 9,669,944 B2 * | 6/2017 | Gagnon | B64D 47/04 | |
| 9,868,431 B1 * | 1/2018 | Ladislao | B64U 10/70 | |
| 9,896,186 B2 * | 2/2018 | Fong | B32B 38/1866 | |
| 9,908,612 B2 * | 3/2018 | Fox | B64C 3/56 | |
| 10,189,557 B2 * | 1/2019 | Boye | B64C 23/072 | |
| 10,501,167 B2 * | 12/2019 | Kracke | B64C 3/56 | |
| 11,066,148 B2 * | 7/2021 | Elenbaas | B64C 3/42 | |
| 11,214,353 B2 * | 1/2022 | Dege | B64C 3/56 | |
| 11,358,708 B2 * | 6/2022 | O'Rourke | B64C 21/08 | |
| 11,440,638 B2 * | 9/2022 | Lorenz | B64C 3/56 | |
| 11,884,382 B2 * | 1/2024 | Wood | B64C 23/069 | |
| 2001/0032907 A1 * | 10/2001 | Borchers | B64C 7/00 | 244/199.1 |
| 2002/0060272 A1 * | 5/2002 | La Roche | B64C 23/069 | 244/199.1 |
| 2002/0092947 A1 * | 7/2002 | Felker | B64C 23/069 | 244/35 R |
| 2002/0162917 A1 * | 11/2002 | Heller | B64C 23/069 | 244/199.4 |
| 2003/0106961 A1 * | 6/2003 | Wyrembek | B64C 23/076 | 244/113 |
| 2004/0155157 A1 * | 8/2004 | Bray | B64C 23/076 | 244/198 |
| 2004/0262451 A1 * | 12/2004 | McLean | B64C 23/069 | 244/45 R |
| 2005/0013694 A1 * | 1/2005 | Kovalsky | B64C 27/46 | 416/226 |
| 2005/0045765 A1 * | 3/2005 | Pitt | B64C 3/42 | 244/46 |
| 2005/0133672 A1 * | 6/2005 | Irving | B64C 23/072 | 244/201 |
| 2005/0173592 A1 * | 8/2005 | Houck, II | B64C 39/066 | 244/45 R |
| 2005/0184196 A1 * | 8/2005 | Shmilovich | B64C 23/076 | 244/199.3 |
| 2006/0027703 A1 * | 2/2006 | Bussom | B64C 23/072 | 244/17.13 |
| 2006/0118675 A1 * | 6/2006 | Tidwell | B64C 3/40 | 244/123.1 |
| 2006/0144992 A1 * | 7/2006 | Jha | B64C 3/40 | 244/46 |
| 2007/0018037 A1 * | 1/2007 | Perlo | B64C 39/08 | 244/45 R |
| 2007/0018049 A1 * | 1/2007 | Stuhr | B64C 23/069 | 244/124 |
| 2007/0114327 A1 * | 5/2007 | Dees | B64C 9/323 | 244/34 R |

(56) References Cited

U.S. PATENT DOCUMENTS

| | | | |
|---|---|---|---|
| 2007/0131821 A1* | 6/2007 | Johan | B64C 3/10 244/91 |
| 2007/0252031 A1* | 11/2007 | Hackett | B64C 23/069 244/17.11 |
| 2007/0262205 A1* | 11/2007 | Grant | B64C 23/072 244/199.2 |
| 2008/0116322 A1* | 5/2008 | May | B64C 23/076 244/199.4 |
| 2008/0145219 A1* | 6/2008 | McVeigh | B64C 27/46 416/23 |
| 2008/0191099 A1* | 8/2008 | Werthmann | B64C 23/072 244/199.4 |
| 2008/0223991 A1* | 9/2008 | Mann | B64C 23/069 244/199.4 |
| 2008/0308683 A1* | 12/2008 | Sankrithi | B64C 23/076 244/199.4 |
| 2009/0014596 A1* | 1/2009 | Pearson | B64C 39/024 244/46 |
| 2009/0039204 A1* | 2/2009 | Eberhardt | B64C 23/069 244/199.4 |
| 2009/0065632 A1* | 3/2009 | Cazals | B64D 27/16 244/54 |
| 2009/0084904 A1* | 4/2009 | Detert | B64C 23/065 244/199.4 |
| 2009/0127861 A1* | 5/2009 | Sankrithi | F03B 13/264 290/54 |
| 2009/0148301 A1* | 6/2009 | Leahy | B64C 27/473 416/223 R |
| 2009/0194638 A1* | 8/2009 | Dennis | B64C 23/069 29/525.01 |
| 2009/0224107 A1* | 9/2009 | McLean | B64C 23/069 244/199.4 |
| 2009/0230240 A1* | 9/2009 | Osborne | B64C 9/34 244/87 |
| 2009/0232040 A1* | 9/2009 | Abdel-Kader | G01D 7/08 370/311 |
| 2009/0256029 A1* | 10/2009 | Malachowski | B64C 23/069 244/199.4 |
| 2009/0269205 A1* | 10/2009 | Leahy | B64C 27/473 416/239 |
| 2009/0283639 A1* | 11/2009 | Ackermann | B64C 23/069 244/131 |
| 2009/0302167 A1* | 12/2009 | Desroche | B64C 23/069 244/199.4 |
| 2010/0006706 A1* | 1/2010 | Breitsamter | B64C 13/16 701/4 |
| 2010/0012773 A1* | 1/2010 | Im | B64D 11/00 244/119 |
| 2010/0019094 A1* | 1/2010 | Theurich | B64C 23/069 244/199.4 |
| 2010/0044501 A1* | 2/2010 | Silich | B64C 15/14 244/52 |
| 2010/0123047 A1* | 5/2010 | Williams | B64C 39/028 244/35 R |
| 2010/0155541 A1* | 6/2010 | Garang | B64C 23/069 244/199.4 |
| 2010/0163670 A1* | 7/2010 | Dizdarevic | B64C 3/10 244/36 |
| 2010/0181432 A1* | 7/2010 | Gratzer | B64C 23/069 244/199.4 |
| 2010/0266413 A1* | 10/2010 | Naumenko | F03D 3/062 416/203 |
| 2010/0303634 A1* | 12/2010 | Long | F04D 29/324 114/140 |
| 2010/0327111 A1* | 12/2010 | Sanderson | H01R 39/64 439/32 |
| 2011/0006165 A1* | 1/2011 | Ireland | B64C 23/06 244/200.1 |
| 2011/0024556 A1* | 2/2011 | Cazals | B64C 23/076 244/99.12 |
| 2011/0024566 A1* | 2/2011 | Soenarjo | H02G 11/02 244/131 |
| 2011/0031354 A1* | 2/2011 | Kelleher | B64C 23/069 244/45 R |
| 2011/0042524 A1* | 2/2011 | Hemmelgarn | B64C 3/48 244/203 |
| 2011/0084174 A1* | 4/2011 | Hemmelgarn | F03D 1/0675 416/241 R |
| 2011/0095128 A1* | 4/2011 | Schwarze | B64C 5/06 244/87 |
| 2011/0101169 A1* | 5/2011 | Schaber | B64C 23/065 244/199.3 |
| 2011/0192937 A1* | 8/2011 | Buescher | B64C 23/069 244/199.4 |
| 2011/0260008 A1* | 10/2011 | Smith | B64C 23/069 416/232 |
| 2012/0027594 A1* | 2/2012 | Lewke | F03D 1/0633 416/146 R |
| 2012/0049010 A1* | 3/2012 | Speer | B64C 23/069 244/45 R |
| 2012/0091262 A1* | 4/2012 | Rawdon | B64C 23/069 244/199.4 |
| 2012/0104181 A1* | 5/2012 | Rix | B64C 3/48 244/219 |
| 2012/0112005 A1* | 5/2012 | Chaussee | B64C 23/072 244/123.1 |
| 2012/0185181 A1* | 7/2012 | Chankaya | B64C 23/076 702/41 |
| 2012/0187251 A1* | 7/2012 | Guida | B64C 23/076 244/76 R |
| 2012/0286102 A1* | 11/2012 | Sinha | B64C 29/0025 244/7 B |
| 2012/0286122 A1* | 11/2012 | Tankielun | G01R 29/0864 248/346.06 |
| 2012/0312929 A1* | 12/2012 | Gratzer | B64C 23/069 244/199.4 |
| 2013/0092797 A1* | 4/2013 | Wright | B64C 3/58 244/199.4 |
| 2013/0256460 A1* | 10/2013 | Roman | B64C 5/08 244/199.4 |
| 2013/0292508 A1* | 11/2013 | Fox | B64C 3/56 244/49 |
| 2014/0014768 A1* | 1/2014 | Lassen | B64C 3/56 244/49 |
| 2014/0117166 A1* | 5/2014 | Campbell, Jr | B64C 23/069 244/199.4 |
| 2014/0159965 A1* | 6/2014 | Le | H01Q 1/287 343/705 |
| 2014/0306067 A1* | 10/2014 | Guida | B64C 23/076 244/199.4 |
| 2014/0328694 A1* | 11/2014 | Campbell, Jr. | B64C 23/069 156/60 |
| 2014/0346281 A1* | 11/2014 | Gratzer | B64C 23/069 244/199.4 |
| 2015/0014478 A1* | 1/2015 | Lassen | B64C 3/56 244/49 |
| 2015/0028151 A1* | 1/2015 | Bevirt | B64C 23/076 244/6 |
| 2015/0041597 A1* | 2/2015 | Theurich | B64C 23/069 244/199.4 |
| 2015/0108283 A1* | 4/2015 | Thoreen | B64D 45/0005 244/234 |
| 2015/0203190 A1* | 7/2015 | Witte | B64C 23/069 244/199.4 |
| 2015/0210377 A1* | 7/2015 | Good | B64C 3/56 244/49 |
| 2016/0009379 A1* | 1/2016 | Witte | B64D 45/02 156/60 |
| 2016/0039379 A1* | 2/2016 | Saitoh | B60R 21/0136 293/117 |
| 2016/0075429 A1* | 3/2016 | Fong | B64C 23/069 156/182 |
| 2016/0130012 A1* | 5/2016 | Laguia-Barnola | B64C 23/069 705/26.7 |
| 2016/0144969 A1* | 5/2016 | Rawdon | B64U 50/31 244/199.4 |
| 2016/0244146 A1* | 8/2016 | Harding | B64C 23/072 |
| 2017/0113780 A1* | 4/2017 | Boye | B64U 30/12 |

(56) References Cited

U.S. PATENT DOCUMENTS

| | | | |
|---|---|---|---|
| 2017/0137116 A1* | 5/2017 | Ireland | B64C 23/06 |
| 2017/0190410 A1* | 7/2017 | Good | B64C 3/56 |
| 2017/0233065 A1* | 8/2017 | Swanson | B64C 23/069 |
| | | | 244/199.4 |
| 2017/0247105 A1* | 8/2017 | Heller | B64C 23/069 |
| 2017/0253319 A1* | 9/2017 | Vance | B64C 39/024 |
| 2017/0253322 A1* | 9/2017 | Krebs | B64C 39/04 |
| 2017/0260966 A1* | 9/2017 | Gratzer | F03D 7/06 |
| 2017/0341728 A1* | 11/2017 | Moore | B64C 23/069 |
| 2017/0355441 A1* | 12/2017 | Winkelmann | F15B 9/10 |
| 2018/0043985 A1* | 2/2018 | Thompson | B64C 13/0425 |
| 2018/0050790 A1* | 2/2018 | Whitehouse | B64C 23/069 |
| 2018/0057144 A1* | 3/2018 | Lorenz | B64C 3/56 |
| 2018/0099735 A1* | 4/2018 | Kelly | B64C 3/56 |
| 2018/0237128 A1* | 8/2018 | Commis | B64C 23/065 |
| 2018/0312242 A1* | 11/2018 | Brakes | B64C 1/30 |
| 2018/0334253 A1* | 11/2018 | Geneste | B64C 3/10 |
| 2019/0002083 A1* | 1/2019 | Wilson | B64C 23/072 |
| 2019/0071174 A1* | 3/2019 | Burigo | B64U 30/297 |
| 2019/0092448 A1* | 3/2019 | Boscarino | B64U 60/40 |
| 2019/0152578 A1* | 5/2019 | Dege | B64D 45/0005 |
| 2019/0152579 A1* | 5/2019 | Dege | B64C 3/56 |
| 2019/0152580 A1* | 5/2019 | Dege | F15B 21/0427 |
| 2019/0152624 A1* | 5/2019 | Dege | G01N 3/22 |
| 2019/0248468 A1* | 8/2019 | Lorenz | F16H 25/20 |
| 2019/0248476 A1* | 8/2019 | Petscher | B64C 23/065 |
| 2019/0283859 A1* | 9/2019 | Bishop | B64C 23/072 |
| 2019/0322351 A1* | 10/2019 | Lorenz | F16D 55/38 |
| 2019/0322355 A1* | 10/2019 | Wilson | B64C 13/50 |
| 2019/0337605 A1* | 11/2019 | Lorenz | B64C 1/30 |
| 2019/0359311 A1* | 11/2019 | Lorenz | B64C 3/56 |
| 2019/0359312 A1* | 11/2019 | Lorenz | B64C 3/56 |
| 2019/0367154 A1* | 12/2019 | Weder | B64C 3/56 |
| 2019/0367155 A1* | 12/2019 | Dege | B64C 3/56 |
| 2019/0389559 A1* | 12/2019 | Lorenz | B64C 3/56 |
| 2020/0001982 A1* | 1/2020 | Utt | B64C 3/14 |
| 2020/0023938 A1* | 1/2020 | Dege | B64C 3/56 |
| 2020/0130816 A1* | 4/2020 | O'Rourke | B64C 3/546 |
| 2020/0247525 A1* | 8/2020 | Manterola Ottonello | |
| | | | B64C 3/38 |
| 2020/0339249 A1* | 10/2020 | Petscher | B64C 23/069 |
| 2020/0361596 A1* | 11/2020 | Lorenz | B64C 3/56 |
| 2020/0385106 A1* | 12/2020 | Schoppe | B64C 27/022 |
| 2020/0398969 A1* | 12/2020 | Lorenz | B64C 9/34 |
| 2020/0398972 A1* | 12/2020 | Petscher | B64C 23/069 |
| 2021/0061437 A1* | 3/2021 | Daandels | B64C 9/24 |
| 2022/0177112 A1* | 6/2022 | Older | B64C 23/072 |
| 2022/0177117 A1* | 6/2022 | Older | B64C 23/072 |
| 2022/0250736 A1* | 8/2022 | Kelly | B64C 3/48 |
| 2023/0242242 A1* | 8/2023 | Edwards | H04B 5/72 |
| | | | 244/46 |
| 2023/0242245 A1* | 8/2023 | Edwards | B64C 23/072 |
| | | | 244/199.4 |
| 2024/0069573 A1* | 2/2024 | Liberson | G05D 1/0808 |

OTHER PUBLICATIONS

Combined Search and Examination Report for Application No. GB 2201251.2, dated Jul. 26, 2022, 5 pages.

* cited by examiner

AIRCRAFT WING WITH MOVABLE WING TIP DEVICE

CROSS RELATED APPLICATION

This application claims priority to United Kingdom Patent Application GB 2201251.2, filed Jan. 31, 2022, the entire contents of which is hereby incorporated by reference.

FIELD OF THE INVENTION

The present invention relates to an aircraft wing with a movable wing tip device, and a method of operating such a wing.

BACKGROUND OF THE INVENTION

Developments in commercial aircraft have resulted in larger aircraft with higher performance efficiency, for which it is desirable to have correspondingly large wing spans. However, the maximum aircraft wing span is effectively limited by airport operating rules which govern various clearances required when manoeuvring around an airport. To alleviate this problem, it is known to provide aircraft with wings having a foldable portion. In the ground configuration, the foldable portion is moved by, for example, rotation relative to the main body of the wing, such that the overall span of the wing is reduced. Thus, the aircraft can comply with airport operating rules, yet benefit from the larger span in flight. Foldable wings may also be provided on military aircraft to allow aircraft to be stored where space is at a premium, such as on aircraft carriers.

Aircraft may be required to have components in the wings such as, flaps, ailerons, spoilers, lighting arrangements, and other devices which consume power or require control data. It is desirable to communicate data and/or power between the aircraft's wing tips and the main body element of the wing especially in flight. Such components in the wing are not necessarily required when an aircraft is not in flight.

If such components are provided in the movable wing tip device, then a problem which may be encountered is that electrical wiring may need to be provided from the aircraft power system to the movable wing tip device across a joint where the wing is arranged to fold. In service, such wings may move from a retracted to a deployed position several times a day, leading to wear and tear of the wiring and its associated connectors/contacts such that the connection system needs to be frequently maintained.

It is known generally how to transfer data wirelessly, for example, via Wi-Fi™ or Bluetooth®. However, due to reliability and security concerns, this technology is not used for primary flight controls without a large security/compute burden. There is, therefore, a strong preference in the aircraft industry for physical connections.

SUMMARY OF THE INVENTION

A first aspect of the invention provides an aircraft wing comprising a main wing element and a movable wing tip device attached to an end tip of the main wing element. The movable wing tip device can move relative to the main wing element to vary a span of the aircraft wing. An inductive coupler is arranged to inductively transmit data and/or power between the main wing element and the movable wing tip device.

The movable wing tip device can comprise a component. The component can be configured to receive data and/or power from the inductive coupler, and/or the component can be configured to send data and/or power to the inductive coupler. The component can comprise a control surface actuator.

The inductive coupler can comprise a base and a remote. The main wing element can comprise the base. The movable wing tip device can comprise the remote. The base can be configured to inductively transmit the data and/or power to the remote. The remote can be configured to inductively transmit data and/or power to the base.

The movable wing tip device may be moved between a deployed position and a retracted position. The aircraft wing can have a smaller span in the retracted position than in the deployed position. The inductive coupler can be arranged to inductively transmit the data and/or power between the main wing element and the movable wing tip device when the movable wing tip device is in the deployed position. The inductive coupler may not be arranged to inductively transmit data and/or power between the main wing element and the movable wing tip device when the movable wing tip device is in the retracted position.

A remote of the inductive coupler can be arranged to move towards a base of the inductive coupler as the movable wing tip device moves to the deployed position, to allow data and/or power to be inductively transmitted between the main wing element and the movable wing tip device.

The inductive coupler can be a first inductive coupler. The remote can be a first remote and the base can be a first base. The aircraft wing can comprise a second inductive coupler comprising a second base and a second remote, the second inductive coupler can be arranged to inductively transmit data and/or power between the main wing element and the movable wing tip device. The first and second inductive couplers can be connected in series.

The main wing element and the movable wing tip device can be connected by a hinge which can be configured to allow the movable wing tip device to rotate relative to the main wing element to vary the span of the aircraft wing. The hinge can comprise a first hinge lug and a second hinge lug. A base of the inductive coupler can be mounted to the first hinge lug, and a remote of the inductive coupler can be mounted to the second hinge lug.

A second aspect of the invention provides a method of running aircraft diagnostics for an aircraft, the aircraft comprising the aircraft wing of the first aspect. The method comprises moving the movable wing tip device relative to the main wing element to reduce the span of the aircraft wing and to expose a base of the inductive coupler. The method further comprises bringing an external remote close to the base and, inductively transmitting data between the base and the external remote to run aircraft diagnostics.

A third aspect of the invention provides a method of operating an aircraft wing, the aircraft wing comprising a main wing element and a movable wing tip device attached to a tip end of the main wing element. The movable wing tip device can move relative to the main wing element to vary a span of the aircraft wing. The method comprising inductively transmitting data and/or power between the main wing element and the movable wing tip device with an inductive coupler. The method can further comprise operating a control surface actuator.

The method can further comprise moving the movable wing tip device relative to the main wing element to vary the span of the aircraft wing between a deployed position and a retracted position. The deployed position can enable inductive transmission of data and/or power by the inductive coupler between the main wing element and the movable wing tip device. The retracted position can prevent inductive transmission of data and/or power by the inductive coupler between the main wing element and the movable wing tip device.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
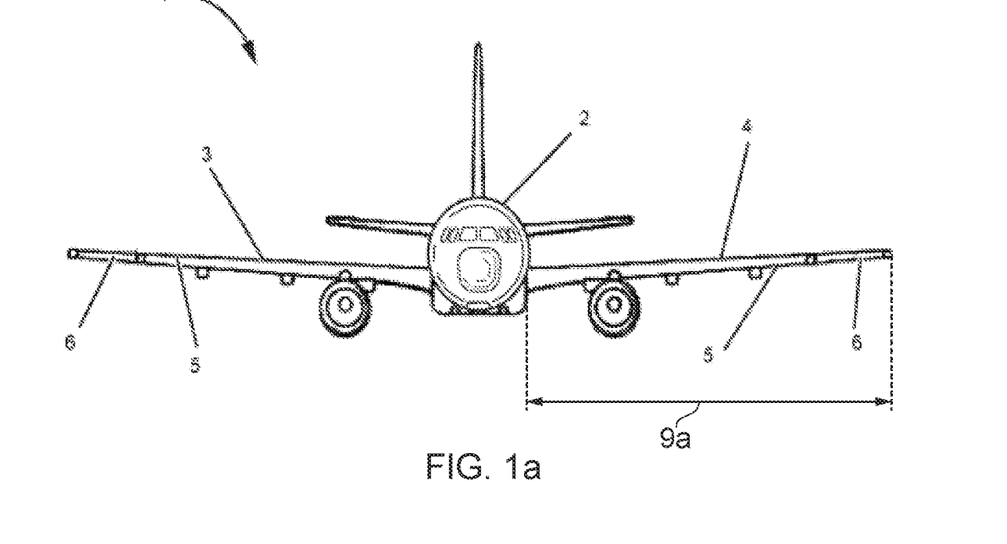
FIG. 1a shows a front view of an aircraft incorporating a wing constructed according to the invention with the movable wing tip device in a deployed position.
Figure 1B:
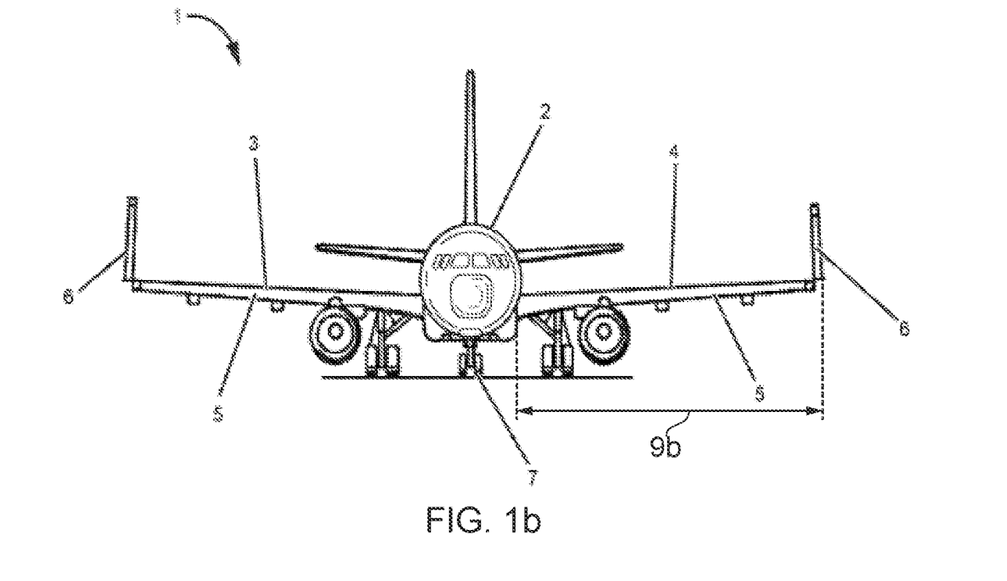
FIG. 1b shows a front view of the aircraft of FIG. 1a with the movable wing tip device in a retracted position.

Like reference numerals refer to like parts throughout the specification. With reference to FIGS. 1a and 1b, a passenger aircraft 1 is shown. The aircraft 1 comprises a fuselage 2 for holding passengers and/or cargo, a starboard wing 3 and a port wing 4. Each of the wings 3, 4 comprises a main wing element 5 and a movable wing tip device 6 at the distal end of the wing. The aircraft 1 is shown in an in-flight configuration in FIG. 1a. In FIG. 1b, the aircraft 1 has its landing gear 7 lowered and is shown in an on-ground configuration, as when taxiing at an airport.

Figure 2A:
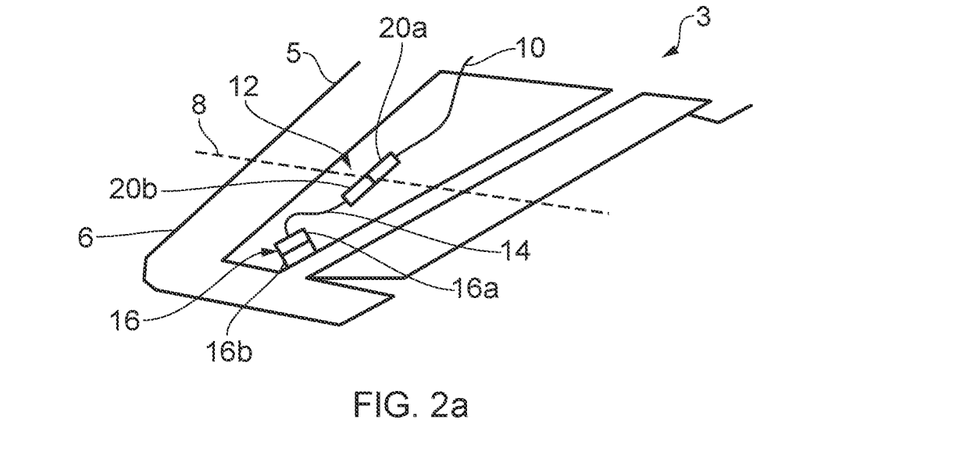
FIG. 2a shows an isometric view of a portion of an aircraft wing constructed according to a first embodiment of the invention with the movable wing tip device in the deployed position.

With reference to FIGS. 1a, 1b, and 2a the main wing element 5 of the wing 3 extends outwardly from the side of the fuselage 2, with the movable wing tip device 6 movably mounted to a tip end of the main wing element 5 by a joint which includes a hinge with a hinge line 8. The hinge line 8 is generally horizontal and aligned in a fore-aft direction parallel with a centre line of the aircraft. This enables rotation of the movable wing tip device 6 with respect to the main wing element 5 in a vertical plane as shown in FIG. 1b. The movable wing tip device 6 may be electro-mechanically or hydraulically actuated by a wing tip actuator to move the movable wing tip device 6 relative to the main wing element 5 and thus vary the span of the aircraft wing 3.

An aircraft control system is provided on the aircraft 1 which controls the wing tip actuator. The wing tip actuator is configured to rotate the movable wing tip device 6 with respect to the main wing element 5 and thus controls the motion of the movable wing tip device 6 between a retracted or folded position (FIGS. 1b, 3a, 3b), and a deployed position (FIGS. 1a and 1b1a, 2a, 2b, 4, 5). The movable wing tip device 6 of each aircraft wing 3, 4 must be in the deployed position for flight. When the aircraft 1 is taxiing at ground level, the pilot may selectively activate the wing tip actuator to cause the movable wing tip device 6 to rotate about the hinge line 8 and into the retracted position, so that the aircraft 1 can fit into smaller spaces whilst maintaining appropriate clearance. There are many suitable means by which the movable wing tip device may move between deployed and retracted positions which are known to the skilled person.

The span of the aircraft wing 4 when the movable wing tip device 6 is in the deployed position is shown in FIG. 1a by arrow 9a. The span of the aircraft wing 4 when the movable wing tip device 6 is in the retracted position is shown in FIG. 1b by arrow 9b. It can be seen from the arrows 9a and 9b that the movable wing tip device 6 can move relative to the main wing element 5 to vary the span of the aircraft wings 3, 4. Specifically, the aircraft wing 4 has a smaller span in the retracted position than in the deployed position (i.e. the length of arrow 9b is less than the length of arrow 9a).

Figure 2B:
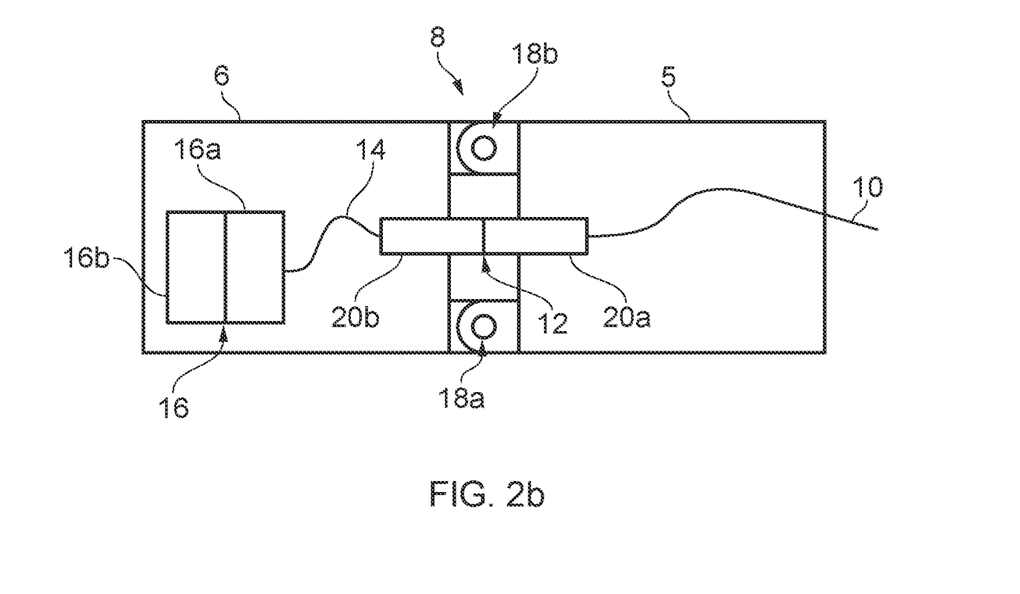
FIG. 2b shows a rear sectional view of the inductive coupler in a portion of the wing of FIGS. 1a, 1b, and 2a with the movable wing tip device in the deployed position.

The aircraft 1 includes an aircraft power system (not shown) and an aircraft control system (not shown). FIGS. 2a and 2b show the starboard wing 3, and the aircraft port wing 4 may be a mirror version of the starboard wing 3. Each wing 3,4 includes a first electrical wire 10, an inductive coupler 12, an electrical input wire 14, and a component 16. The component 16 in this example comprises an accumulator 16a and a device 16b. The component 16 is configured to receive data and/or power from the inductive coupler 12 and may further be configured to transmit data and/or power to the aircraft power system and/or the aircraft control system (or other devices) via the inductive coupler 12.

The inductive coupler 12 is arranged to transmit data and/or power between the main wing element 5 and the movable wing tip device 6, by inductive transmission. Inductive transmission (also known as magnetic induction transmission or magnetic induction communication) is the exchanging of an electromagnetic signal (i.e. data and/or power) wirelessly via a magnetic field. The aircraft power system may transmit and receive power to/from the inductive coupler. Similarly the aircraft control system may transmit and/or receive data to/from the inductive coupler. By way of example the data may be actuation control instructions, notification information etc.

The use of an inductive coupler 12 to transfer data and/or power over the joint reduces maintenance requirements when compared to electrical/hydraulic cables.

The device 16b may comprise an energy consumer which is energised by the aircraft power system. In this case, the accumulator 16a may be configured to accumulate energy from the aircraft power system and output the energy to the energy consumer 16b. The device 16b may be a control surface actuator, a lighting arrangement, a wing tip actuator configured to move the movable wing tip device 6 relative to the main wing element 5 to vary a span of the aircraft wing 3, or any other energy consumer (i.e. a device which consumes energy). A control surface actuator is an actuator which is configured to actuate a control surface of the movable wing tip device 6, such as a flap, slat or aileron. In some examples, there may be multiple energy consumers (similar or different to device 16b) energised by the accumulator 16a and/or the aircraft power system.

In this example the device 16b is part of the movable wing tip device 6, but in other examples the accumulator 16a may be in the movable wing tip device 6 but the device 16b located on some other part of the aircraft such as the main wing element 5 or the fuselage 2.

The accumulator 16a enables energy to trickle between the main wing element 5 and the movable wing tip device 6 whilst still providing a suitable power source for the device 16b. The aircraft 1 comprises a power source to transmit power to the accumulator 16a, and the device 16b is configured to consume more power from the accumulator 16a than the power source is configured to transmit to the accumulator 16a. Specifically, the device 16b may be configured to consume more power than the inductive coupler 12 is configured to transmit between the main wing element 5 and the movable wing tip device 6.

The amount of energy stored by the accumulator 16a will vary, depending on the requirements of the energy consumer. Typically, the accumulator 16a is configured to store more than 0.02 kWh, 0.1 kWh, or 0.5 kWh. However, the accumulator 16a can be configured with a storage capacity in the range of 3 kWh to 12 kWh.

The inductive coupler 12 comprises a base 20a and a remote 20b. The base 20a is configured to transmit data and/or power to the remote 20b, and the remote 20b is configured to receive the data and/or power. The remote 20b may also be configured to transmit data and/or power to the base 20a, which in turn is configured to receive the data and/or power.

The main wing element 5 comprises the base 20a, which is mounted at the tip end of the main wing element 5. The base 20a is configured to electrically couple with the aircraft power system and/or the aircraft control system via the wire 10. The movable wing tip device 6 comprises the remote 20b, which is mounted at the inboard end of the movable wing tip device 6. The remote 20b is configured to electrically couple with the component 16 via the input wire 14.

The base 20a is configured to inductively transmit data and/or power (e.g. from the aircraft power system and/or the aircraft control system) to the remote 20b. The remote 20b may be configured to inductively transmit data and/or power in the opposite direction (e.g. from the component 16) to the base 20a. That is, the base 20a and the remote 20b may be arranged for: one-way transmission or two-way transmission of data; and/or, one-way transmission or two-way transmission of power.

When the movable wing tip device 6 of the wing 3 is in the deployed position (FIGS. 1a, 2a, 2b, 4, 5), the base 20a is sufficiently close to the remote 20b such that the base 20a and remote 20b can inductively transmit data and/or power between the main wing element 5 and the movable wing tip device 6. For the base 20a to be able to inductively transmit to the remote 20b, the base 20a must be substantially aligned with the remote 20b (i.e. the axes of the coils of the base 20a and the remote 20b must be co-linear with each other) and the base 20a must be sufficiently close to allow for inductive transmission of data and/or power (i.e. the base 20a and the remote 20b must be within inductive proximity to each other).

There is generally a power and/or data demand by the component 16 when the aircraft 1 is in flight and the movable wing tip device 6 is in the deployed position. There is also generally a lack of demand for power and/data by the component 16 when the aircraft 1 is on the ground and the movable wing tip device 6 is in the retracted position. Beneficially, the base 20a and the remote 20b are arranged to inductively transmit between each other only when there is demand for data and/or power between the movable wing tip device 6 and the main wing element 5, i.e. when the movable wing tip device 6 is in the deployed position. When demand for data and/or power between the movable wing tip device 6 and the main wing element 5 is absent, the base 20a and the remote 20b are arranged to not be in inductive communication with each other, i.e. when the movable wing tip device 6 is in the retracted position.

FIG. 2b shows the main wing element 5 and the movable wing tip device 6 in a sectional view from the back of the wing 3. The tip end of the main wing element 5 and the inboard end of the movable wing tip device 6 are attached together at the hinge line 8 by a hinge 18b. The hinge 18b comprises a pair of coupled hinge lugs connected by a hinge pin. When the movable wing tip device 6 is in its deployed position as in FIG. 2b, then the main wing element 5 and the movable wing tip device 6 are also coupled together by a lower pair of coupled lugs 18a.

The lower pair of coupled lugs 18a can be uncoupled to enable the movable wing tip device 6 to move between the deployed position and the retracted position about the hinge line 8. Thus, the main wing element 5 and the movable wing tip device 6 are connected by the hinge 18b, and the hinge 18b is configured to allow the movable wing tip device 6 to rotate relative to the main wing element 5 to vary the span of the aircraft wing 3.

Alternatively, the lower pair of coupled lugs 18a can be configured as a hinge which enables the movable wing tip device 6 to rotate down into a downturned retracted position. In this case, the hinge lugs of the hinge 18b can be uncoupled to enable the movable wing tip device 6 to rotate down about the lower pair of coupled lugs 18a.

The movable wing tip device 6 may be manufactured as a stand-alone product, incorporating the component 16, and optionally incorporating the remote 20b of the inductive coupler. The movable wing tip device 6 can then be supplied to a wing manufacture for attachment to the main wing element 5. In this case, the movable wing tip device 6 may comprise one of the pair of hinge lugs and/or one of the pair of coupled lugs 18a.

With a different joint configuration, the movable wing tip device 6 may rotate forwards or backwards in the plane of the wing 3 to reduce the wingspan of the aircraft, i.e., changing the sweep angle of the movable wing tip device 6, such that the movable wing tip device 6 moves neither upwards nor downward to reduce the wing span of the aircraft. The movable wing tip device 6 may therefore rotate in a horizontal plane generally parallel to the length of the fuselage 2 of the aircraft 1. Moreover, any movement (horizontal and/or vertical) of the movable wing tip device 6 which varies the span of the aircraft wing 3 can be used, and corresponding mechanisms for such movement are known to the skilled person.

Figure 3A:
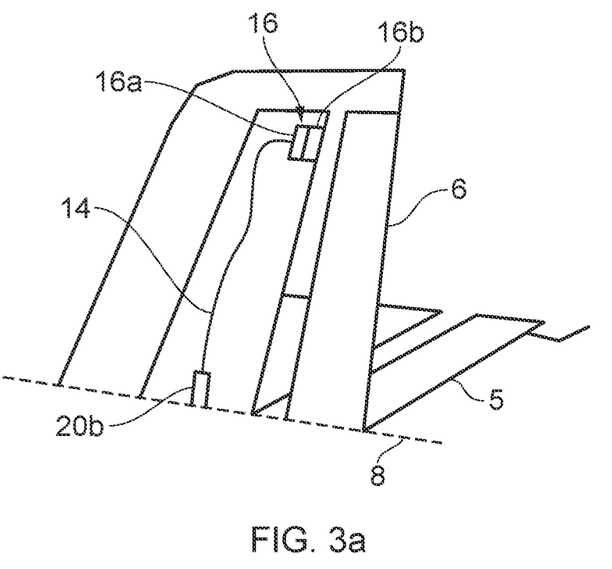
FIG. 3a shows an isometric view of a portion of the wing of FIGS. 1a, 1b, 2a, 2b with the movable wing tip device in the retracted position.
Figure 3B:
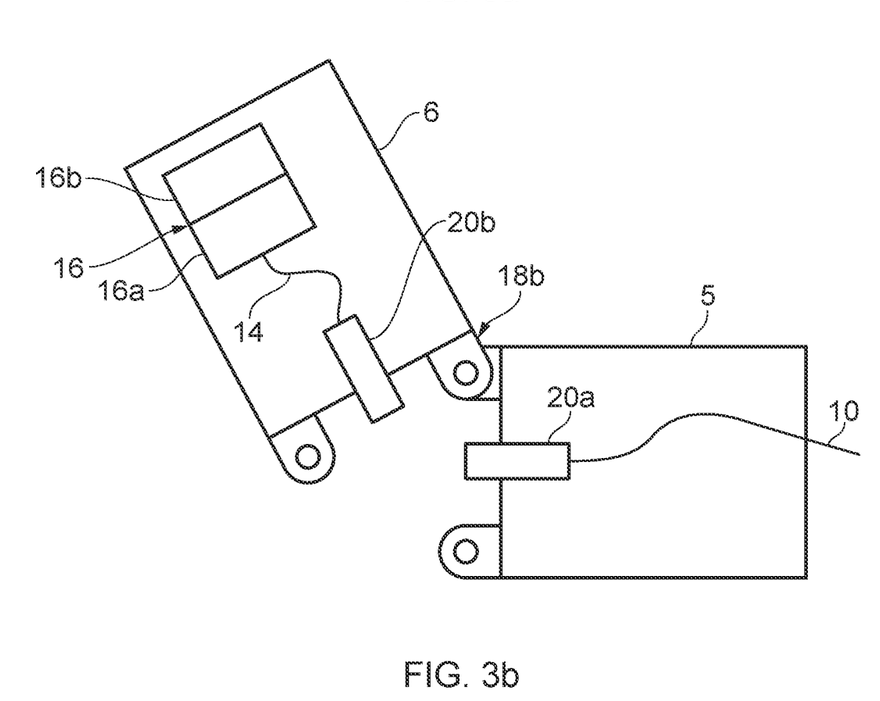
FIG. 3b shows a rear sectional view of the inductive coupler in a portion of the wing of FIG. 3a with the movable wing tip device in the retracted position.

When the aircraft 1 is taxiing on the ground, the wing tip actuator is activated to rotate the movable wing tip device 6 up into the retracted position shown in FIGS. 1b, 3a, 3b. In the retracted position, the base 20a and remote 20b have moved away from each other and are no longer aligned with each other. This prevents the inductive coupler 12 from inductively transmitting data and/or power when the movable wing tip device 6 is in the retracted position.

In contrast, the remote 20b of the inductive coupler 12 is arranged to move towards the base 20a of the inductive coupler 12 as the movable wing tip device 6 moves to the deployed position, to allow data and/or power to be inductively transmitted between the main wing element 5 and the movable wing tip device 6.

FIGS. 3a and 3b show the movable wing tip device 6 in the retracted position. In the retracted position, the base 20a is exposed as shown in FIG. 3b. When the base 20a is exposed, it can act as a maintenance data transfer point. A maintenance device (not shown) can comprise an external remote (not shown). A maintenance worker can bring the external remote (not shown) close to the base 20a to inductively transmit data between the base 20a and the external remote to run aircraft diagnostics. Since the movable wing tip device 6 will likely be configured in the retracted position during on-ground maintenance, the exposed base 20a of the inductive coupler 12 provides a convenient access point for running diagnostics or downloading/uploading data. It would be understood that the base 20a or the remote 20b may be positioned in the main wing element 5 and/or movable wing tip device 6. Therefore, in the retracted position a maintenance worker may use an external respective base or remote to inductively transmit data between the aircraft 1 and the maintenance device. In addition, since the movable wing tip device 6 may only be connected to the main wing element 5 at the hinge 18b, the moveable wing tip device 6 can be easily disconnected from the main wing element 5 at the hinge 18b. This allows a maintenance worker to quickly disconnect, replace and repair the movable wing tip device 6 without cutting or disconnecting cables/wires.

The source of power may not be a single source of power from the aircraft power system (not shown) but may be multiple power sources. The source of data may not be a single source of data from the aircraft control system (not shown), but may be multiple data sources, for example, which provide operating instructions for different actuators, lighting systems or other devices.

Figure 4:
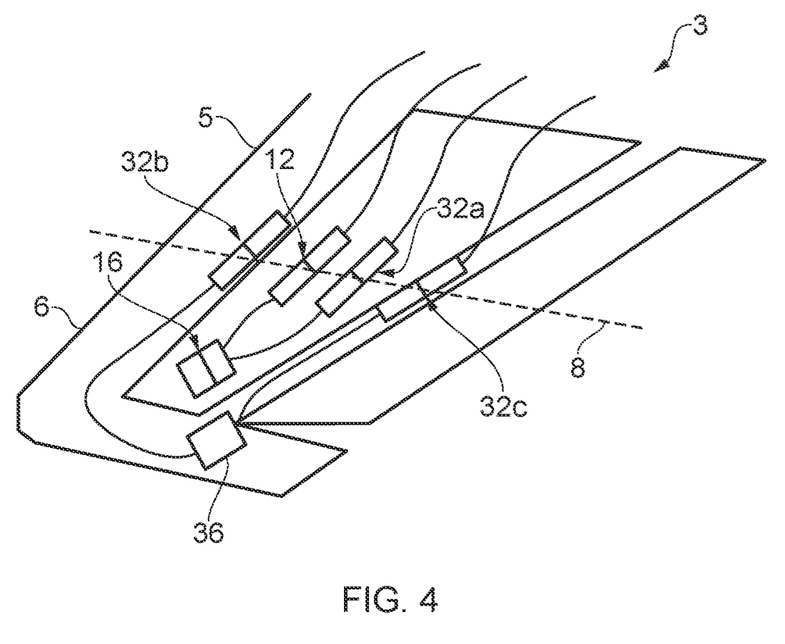
FIG. 4 shows an isometric view of a portion of a wing constructed according to a second embodiment of the invention with a movable wing tip device in the deployed position.

FIG. 4 shows a second embodiment of the wing 3. The movable wing tip device 6 is in the deployed position. In this case the wing 3 comprises four inductive couplers 12, 32a, 32b, 32c. A first electrical loop is shown comprising the inductive coupler 12, the component 16, and a second inductive coupler 32a. A second electrical loop is shown comprising a third inductive coupler 32b, a second component 36, and a fourth inductive coupler 32c. A plurality of data and/or power sources may be provided in order to inductively transmit data and/or power across the joint between the main wing element 5 and the movable wing tip device 6. Alternatively, each inductive coupler (when multiple inductive couplers are present) may be connected to a respective component similar to the example shown at FIG. 2a. Alternatively, multiple inductive couplers can be connected in parallel to a single component in the movable wing tip device. This enables a greater instantaneous rate of data and/or energy transfer to/from the component.

Advantageously, each electrical loop (with or without component 16, 36) shown in FIG. 4 can be configured as a sensor to sense if the movable wing tip device 6 and the main wing element 5 are in the deployed position. Each electrical loop formed of a first inductive coupler and a second inductive coupler arranged in series would only be able to transmit a signal (without a certain threshold signal loss) if the movable wing tip device 6 and the main wing element 5 were in the deployed position. Thus, the first and second inductive couplers 12, 32a are connected in series to sense if the movable wing tip device 6 is in the deployed position. This also ensures that data and/or power are only transmitted when components are properly positioned. When the movable wing tip device 6 is in its retracted position, components on the movable wing tip device 6 are disconnected. Therefore, components on the movable wing tip device 6 can be automatically deactivated without the use of a physical switch or connector. Thus, the components of the movable wing tip device 6 are de-powered and thus safe for a maintenance worker to work on.

Figure 5:
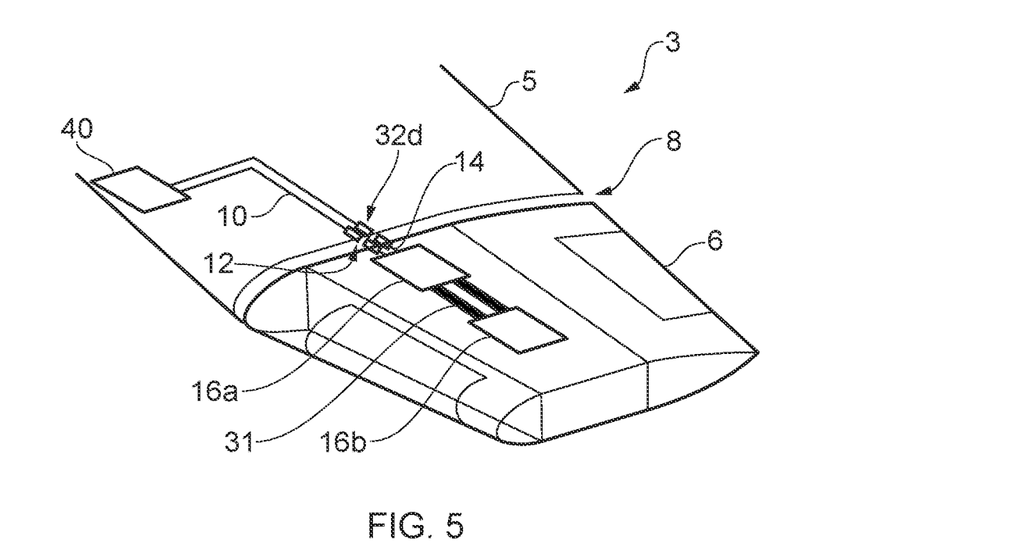
FIG. 5 shows an isometric view of a portion of a wing constructed according to a third embodiment of the invention with a movable wing tip device in the deployed position.

FIG. 5 shows a third embodiment of the wing 3. The main wing element 5 comprises a power source 40 coupled to two inductive couplers 12, 32d. The accumulator 16a is coupled to both inductive couplers 12, 32d by input wires (not shown), and the device 16b is coupled to the accumulator 16a by output wires 31.

The power transmission across a typical inductive coupler is limited. Therefore, to supply devices which have a high peak power demand (such as a wing tip actuator or a control surface actuator) the accumulator 16a is provided in the movable wing tip device 6. The accumulator 16a receives energy from one or both of the inductive couplers 12, 32d and stores the energy until the energy consumer (device 16b) requires it. The accumulator 16a may be coupled to one or more energy consumers such as: a wing tip actuator; a control surface actuator (e.g. for a flap, slat or aileron); a lighting arrangement; and/or any other energy consumer.

The power system of the aircraft 1 is configured to transmit power across the inductive couplers 12, 32d to the accumulator 16a up to, or at, a first peak power level, and the accumulator 16a is configured to transmit power to the device 16b up to, or at, a second peak power level, wherein the first peak power level is lower than the second peak power level. In FIG. 5, this is shown by the relative thickness of the lines (each line representing a wire 10) between the power source 40 and the accumulator 16a, and the thickness of the lines (each line representing an output wire 31) between the accumulator 16a and the device 16b.

The accumulator 16a may be any device suitable for storing energy, such as a super capacitor, battery, hydraulic pump with a hydraulic accumulator, pneumatic pump with a pneumatic accumulator, flywheel, or hydrogen fuel cell with a hydrogen tank, etc. The accumulator 16a can be operated to generate power from the stored energy to power the device 16b or other devices on the aircraft 1. Advantageously, a hydraulic pump with a hydraulic accumulator, can efficiently store energy as hydraulic energy and efficiently drive any hydraulic devices (such as a hydraulic actuator) within the movable wing tip device 6. Advantageously, a pneumatic pump with a pneumatic accumulator, can efficiently store energy as pneumatic energy and efficiently drive any pneumatic devices (such as a pneumatic actuator) within the movable wing tip device 6. A hydrogen fuel cell with a hydrogen tank can act as an energy accumulator by receiving electrical energy via the inductive coupler then operating the fuel cell to generate hydrogen using the electrical power. Thus the hydrogen in the hydrogen tank acts as an energy store. An embodiment may comprise multiple of the same, or different, accumulator types mentioned above, for example, the movable wing tip device 6 may comprise a super capacitor and a battery.

When the accumulator 16a is a super capacitor, a battery, a flywheel, a hydrogen fuel cell with a hydrogen tank, or any other accumulator which receives and transmits electrical power, then each electrical wire 10 between the inductive couplers 12, 32d and the power supply 40 (and also each electrical input wire between the inductive couplers 12, 32d and the accumulator 16a) may be rated for a low electrical power level/low current level. This enables the accumulator 16a to receive and store a constant trickle of energy. In addition, each electrical output wire 31 coupling the accumulator 16a and the device 16b may be rated for a high electrical power level/high current level, to tolerate an intermittent higher peak power/higher peak current when the device 16b demands power. Alternatively, all electrical wires may be rated for the same electrical power level/current level but there may be more electrical wires between the accumulator 16a and the device 16b in order to tolerate a higher peak power/higher peak current.

Figure 6:
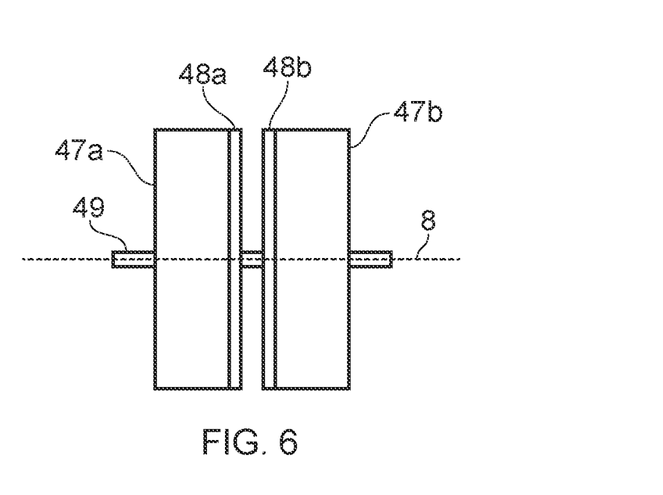
FIG. 6 shows a sectional view of a hinge comprising a base and a remote of an inductive coupler.

FIG. 6 shows an alternative or additional location of an inductive coupler at the hinge line 8. The inductive coupler in FIG. 6 comprises a base 48a and a remote 48b, each mounted on a respective hinge lug 47a, 47b of the hinge 18b. Specifically, each coil of the base 48a and the remote 48b is fitted to the inner face of a respective hinge lug 47a, 47b of the hinge 18b. A hinge pin 49 of the hinge 18b passes through the lugs 47a, 47b and extends along the hinge line 8.

In this example, the base 48a and remote 48b of the inductive coupler will always be in alignment (the axes of the base 48a and remote 48b coils remain co-axial with the hinge line 8) so long as the faces of the respective hinge lugs 47a, 47b are coupled via the hinge pin 49. When the movable wing tip device 6 is moved from a deployed position to a retracted position, the distance from the base 48a to the remote 48b does not change. The base 48a and the remote 48b rotate relative to each other about the hinge line 8, such that the plane of the base 48a and the plane of the remote 48b remain parallel.

It is known that typical inductive couplers are not as efficient as typical electrical wires, and this inefficiency can cause a heating effect. Therefore, when the inductive coupler 45 is fitted into the hinge lugs 47a, 47b as in FIG. 6, this can advantageously prevent icing or cause de-icing at the hinge 18b. A similar beneficial heating effect may also be present in the other embodiments disclosed herein.

The accumulator 16a may be used as a store of energy which can be transmitted to the main wing element 5 if required. Thus, the accumulator 16a may not exclusively power energy consumers within the movable wing tip device 6, such as the device 16b.

In FIG. 6, the base 48a and the remote 48b are located at the hinge 18b, but in an alternative embodiment (not shown) the base and remote of the inductive coupler may be mounted on the lower pair of coupled lugs 18a. In this case the remote will move away from the base as the wing tip device 6 is rotated up to its retracted position. The heating effect of the inductive coupler 45 may advantageously prevent icing or cause de-icing at the lower pair of coupled lugs 18a.

In an alternative embodiment, the movable wing tip device 6 may be replaced by a movable semi aeroelastic wing tip device, which moves during flight for the purpose of gust alleviation.

The wing tip actuator can be positioned in either the main wing element 5 or in the movable wing tip device 6 (for instance the device 16b may be the wing tip actuator). If the wing tip actuator is positioned in the movable wing tip device 6, then energy from the inductive coupler or stored in the accumulator 16a could be used to drive the wing tip actuator to move the movable wing tip device 6 between the deployed position and retracted position. If the wing tip actuator is positioned in the movable wing tip device 6, this frees-up space at the tip end of the main wing element 5 for other aircraft components.

The accumulator 16a of any embodiment may be mounted traditionally in the leading or trailing edge areas, using known design principles, for example, the accumulator 16a may be mounted on the outer front face of the front spar, or on the outer rear face of the rear spar. Alternatively, the accumulator 16a may be located at any of the positions shown in FIG. 7a or 7b, between the front spar and the rear spar.

Figure 7A:
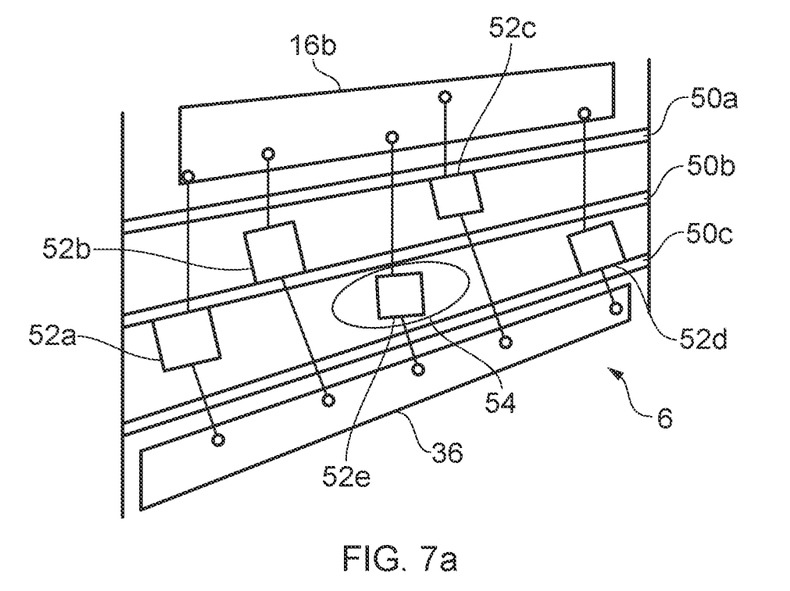
FIG. 7a shows a planform view of a multi-spar movable wing tip device showing possible accumulator positions.

FIG. 7a shows an example of the movable wing tip device 6 in a planform view in which the accumulator 16a is in any number of accumulator positions 52a-52e. The movable wing tip device 6 shown in FIG. 7a is a multi-spar movable wing tip device 6 with three spars 50a-50c (front spar 50c, mid-spar 50b and rear spar 50a).

A number of possible accumulator positions 52a-52e are shown between the front spar 50c and the rear spar 50a, although it would be understood that only one is necessary. The accumulator 16a may be integrated into the multi-spar movable wing tip device 6 at any of the possible accumulator positions 52a-52e. The possible accumulator position 52e is in an access area with a removable manhole cover 54 for easy access. One or more accumulators can be fitted into accumulator positions 52a-52e and each installed accumulator is connectable to an inductive coupler, and to two devices 16b, 36 by cables/wires.

Figure 7B:
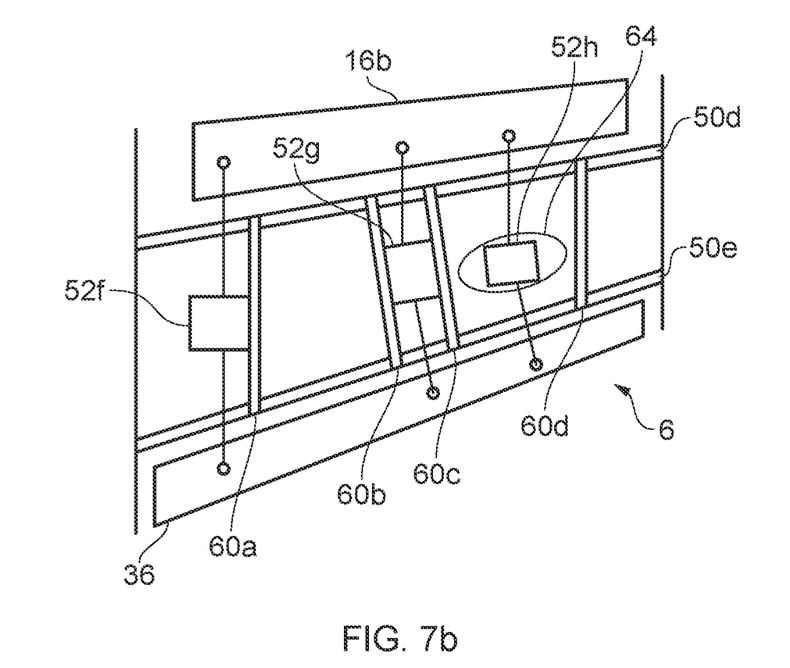
FIG. 7b shows a planform view of a multi-rib movable wing tip device showing possible accumulator positions.

FIG. 7b shows another example of the movable wing tip device 6 in a planform view in which the accumulator 16a is in any number of accumulator positions 52f-52h. The movable wing tip device 6 shown in FIG. 7b is a multi-rib movable wing tip device 6 with two spars (rear spar 50d and front spar 50e) and four ribs 60a-60d. A number of possible accumulator positions 52f-52h are shown, between the front spar 50e and the rear spar 50d, although it would be understood that only one is necessary. The accumulator 16a may be integrated into the multi-rib movable wing tip device 6 between the spars and the ribs as shown in accumulator positions 52g, 52h, or next to a single rib as shown in accumulator position 52f. The possible accumulator position 52h is in an access area with a removable manhole cover 64 for easy access. One or more accumulators can be fitted into accumulator positions 52f-52h and each installed accumulator is connectable to the inductive coupler, and to two devices 16b, 36 by cables/wires.

If an accumulator 16a is positioned in an access area with a removable manhole cover 54, 64 and requires replacement or maintenance, then the accumulator 16a can be disconnected from its respective electrical cables/wires. This enables the accumulator 16a to be easily accessed by a maintenance worker via the access cover to run/perform accumulator diagnostics.

Locating the accumulator 16a in the movable wing tip device 6 is advantageous because its weight will counteract aerodynamic forces acting on the wing 3, 4, which will lower the wing root bending moment (i.e. the bending moment at the inboard end of the wing 3, 4, where the wing 3, 4 meets the fuselage 2).

The movable wing tip device 6 has an inboard end and an outboard end; and a centre of gravity of the accumulator 16a is preferably closer to the inboard end than it is to the outboard end. Locating the centre of gravity of the accumulator 16a in the inboard half of the length of the movable wing tip device 6 is advantageous because i) less force is required to rotate the movable wing tip device 6 up, and ii) it moves the centre of percussion closer to the centre of gravity of the aircraft 1. Thus the accumulator positions 52a, 52b, 52f in the inboard half of the length of the movable wing tip device 6 are preferred.

Advantages of the use of an inductive coupler at the interface between the movable wing tip device and the main wing element will be discussed generally here. The use of an inductive coupler removes the need to bend and flex electrical/hydraulic/pneumatic cables and connectors which results in improved in-service reliability. Inductive couplers are not subject to mechanical wear and are easy to handle and maintain as there are no moving parts in the data/power system. Moreover, less internal wing space would be needed to accommodate cable bend radii in a deployed position, and over flexing of electrical bundles or hydraulic/pneumatic cables is also avoided when the wing is in a retracted position. In addition, since an inductive coupler is not 100% efficient, some local heating may occur which can help with de-icing. When moving the inductive coupler components out of the inductive communication range, the power and/or data transfer is stopped, thus some embodiments have the ability to automatically deactivate the systems on the movable wing tip device without a physical switch connector. Finally, a movable wing tip device which is not physically wired to the main wing element is not physically continuous at the joint. This creates an interchangeable interface between the movable wing tip device and main wing body allowing an operator to quickly disconnect, replace, and repair the movable wing tip device without cutting or disconnecting cables/wires.

In other embodiments, the component 16, 36 of FIGS. 2a to 5 may consist of an accumulator 16a, without an additional device 16b in the movable wing tip device 6. In other embodiments the component 16, 36 of FIGS. 2a to 5 may consist of a device 16b, without an accumulator 16a. Such a device may or may not be an energy consumer—i.e. it may only require data.

Where the terms base and remote are used as components of the inductive coupler, it is understood that these are merely labels for the two components of the inductive coupler. That is, although the term "base" may typically mean a component of an inductive coupler which can send and receive data, and only send power, in the present specification a base can also receive power. Moreover, the term "remote" may typically mean a component of the inductive coupler which can send and receive data, and only receive power, in the present specification a remote can also send power. Thus, the terms "remote" and "base" may be used interchangeably.

Examples of suitable inductive couplers are those made by Balluff® and can be found at https://w.w.w.balluff.com/en-us/products/areas/A009/groups/G0905 accessed on 4 Jan. 2022. Although, the skilled person would be able to identify other inductive couplers.

Where the word 'or' appears this is to be construed to mean 'and/of' (unless the term "and/or" is used specifically) such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing, comprising:
   a main wing element;
   a hinge device having a first lug and a second lug, and a hinge pin extending through the first and the second lugs along a hinge line;
   a movable wing tip device attached to a tip end of the main wing element by the hinge device;
   wherein the movable wing tip device is configured to move relative to the main wing element to vary a span of the aircraft wing;
   an inductive coupler configured to inductively transmit data and/or power between the main wing element and the movable wing tip device; and,
   wherein the inductive coupler includes a base mounted to an inner face of the first lug and a remote mounted to an inner face of the second lug,
   wherein, when the movable wing tip device is moved from a deployed position to a retracted position, the base and the remote rotate relative to each other about the hinge line such that a plane of the base and a plane of the remote remain parallel,
   wherein a distance between the base and the remote will remain the same, and
   wherein the base and the remote of the inductive coupler will remain in alignment.

2. The aircraft wing of claim 1, wherein the movable wing tip device comprises a component; wherein the component is configured to receive data and/or power from the inductive coupler, and/or the component is configured to send data and/or power to the inductive coupler.

3. The aircraft wing of claim 2, wherein the component comprises a control surface actuator.

4. The aircraft wing of claim 1, wherein the inductive coupler comprises a base and a remote, the main wing element comprises the base, the movable wing tip device comprises the remote, and the base is configured to inductively transmit the data and/or power to the remote.

5. The aircraft wing of claim 4, wherein the remote is configured to inductively transmit data and/or power to the base.

6. The aircraft wing of claim 1, wherein the movable wing tip device is configured to move between a deployed position and a retracted position, the aircraft wing has a smaller span in the retracted position than in the deployed position; the inductive coupler is arranged to inductively transmit the data and/or power between the main wing element and the movable wing tip device when the movable wing tip device is in the deployed position; and the inductive coupler is not arranged to inductively transmit data and/or power between the main wing element and the movable wing tip device when the movable wing tip device is in the retracted position.

7. The aircraft wing of claim 1, wherein a remote of the inductive coupler is arranged to move towards a base of the inductive coupler as the movable wing tip device moves to the deployed position, to allow the transmission of data and/or power inductively between the main wing element and the movable wing tip device.

8. The aircraft wing of claim 4, wherein the inductive coupler is a first inductive coupler; the remote is a first remote; the base is a first base; and the aircraft wing further comprises a second inductive coupler comprising a second base and a second remote, wherein the second inductive coupler is arranged to inductively transmit data and/or power between the main wing element and the movable wing tip device.

9. The aircraft wing of claim 8, wherein the first and second inductive couplers are connected in series.

10. The aircraft wing of claim 1, wherein the main wing element and the movable wing tip device are connected by a hinge, the hinge is configured to allow the movable wing tip device to rotate relative to the main wing element to vary the span of the aircraft wing, the hinge comprises a first hinge lug and a second hinge lug, a base of the inductive coupler is mounted to the first hinge lug, and a remote of the inductive coupler is mounted to the second hinge lug.

11. A method of running aircraft diagnostics for an aircraft, the aircraft comprising the aircraft wing of claim 1, the method comprising: moving the movable wing tip device relative to the main wing element to reduce the span of the aircraft wing and to expose a base of the inductive coupler; bringing an external remote close to the base; and, inductively transmitting data between the base and the external remote to run aircraft diagnostics.

12. A method of operating the aircraft wing of claim 1, the method comprising:
  inductively transmitting data and/or power between the main wing element and the movable wing tip device with the inductive coupler.

13. The method of operating an aircraft wing of claim 12, further comprising: operating a control surface actuator.

14. The method of operating an aircraft wing of claim 12, further comprising: moving the movable wing tip device relative to the main wing element to vary the span of the aircraft wing between a deployed position and a retracted position, wherein the deployed position enables inductive transmission of data and/or power by the inductive coupler between the main wing element and the movable wing tip device, and the retracted position prevents inductive transmission of data and/or power by the inductive coupler between the main wing element and the movable wing tip device.

* * * * *